(12) United States Patent
Takeda et al.

(10) Patent No.: US 6,214,528 B1
(45) Date of Patent: Apr. 10, 2001

(54) METHOD OF FORMING MOTHER FOR USE IN OPTICAL DISC

(75) Inventors: Minoru Takeda, Kanagawa; Hisayuki Yamatsu; Motohiro Furuki, both of Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/161,670

(22) Filed: Sep. 29, 1998

(30) Foreign Application Priority Data

Sep. 29, 1997 (JP) .................................................... 9-264009

(51) Int. Cl.$^7$ ............................................................ G03F 7/20
(52) U.S. Cl. .......................... 430/320; 430/322; 430/945
(58) Field of Search .................................. 430/311, 313, 430/945, 320, 322, 323, 325

(56) References Cited

U.S. PATENT DOCUMENTS 5,925,931 * 7/1999 Yamamoto ............................ 257/737

* cited by examiner

*Primary Examiner*—Kathleen Duda
(74) *Attorney, Agent, or Firm*—Sonnenschein, Nath & Rosenthal

(57) ABSTRACT

A photoresist is applied onto a substrate, the photoresist-coated substrate is exposed to a laser beam of 300 nm or less in wavelength to form a latent image indicative of an information signal, and the photoresist on the substrate is developed to form a pit/groove pattern indicating the information signal. The photoresist has a mean value of 0.1 or less between extinction coefficients before and after the exposure to the laser beam.

5 Claims, 4 Drawing Sheets

METHOD OF FORMING MOTHER FOR USE IN OPTICAL DISC

BACKGROUND OF THE INVENTION

1. Field of the Invention

The present invention relates to a method of forming a so-called mother to produce a so-called master used to mold an optical disc.

2. Description of Related Art

An optical disc comprises a transparent substrate having formed thereon a pattern of very fine concavities/convexities including pits and grooves indicative of information signals, a reflective layer provided on the substrate and formed from a metal film such as aluminum film or the like, and a protective layer provided on the reflective layer to protect the reflective layer from moisture and oxygen in the atmosphere.

For producing such an optical disc, a manufacturing process is required in which the optical disc can be replicated instantly with a high fidelity using a high-precision stamper.

To meet the above requirement, a photoresist, namely, a photosensitive resin, is applied onto a glass substrate, the photoresist is exposed to a laser beam to form a latent image corresponding to an information signal, and the photoresist on the glass substrate is developed to form a pattern of pits and grooves in the photoresist, thereby producing a mother. The pit/groove pattern is transferred from the mother to the surface of a metal substrate by electroforming or any other suitable method. The metal substrate thus processed is used as a stamper.

More particularly, a glass substrate having a thickness of about a few millimeters, for example, is applied uniformly on the surface thereof with an ultraviolet ray-sensitive photoresist by a spinner to produce a photoresist layer of 0.1–0.2 $\mu$m. Next, while the glass disc is being spun, the photoresist applied thereon is exposed to a spot of a laser beam such as Ar (ion) laser, Kr (ion) laser or the like of 350–460 nm in wavelength generated in the blue or near ultraviolet zone and which is turned on and off correspondingly to an information signal to be written onto a final optical disc, thereby forming a latent image on the glass substrate. The photoresist on the glass substrate is developed to complete the pit/groove pattern in the photoresist, thereby forming a mother. Then, the pits/grooves pattern is transferred from the mother to the surface of a metal substrate by nickel plating. The metal substrate thus produced is used as a stamper.

Optical disc substrates can be replicated by the stamper in a large quantity by injection molding of a thermoplastic resin such as polycarbonate.

The amount of information recordable in an optical disc depends on the density at which pits or grooves can be formed in the disc. That is to say, the amount of information recordable in an optical disc depends upon how fine the pit/groove pattern can be formed by a so-called cutting process in which a photoresist layer is exposed to a laser beam to have a latent image formed thereon.

A stamper used to produce a read-only digital video disc (DVD-ROM), for example, has pit rows including shortest pits of 0.4 $\mu$m in length spirally formed thereon with a track pitch of 0.74 $\mu$m. An optical disc of 12 cm in diameter produced using this stamper has a storage capacity of 4.7 GB on one side thereof.

A Kr ion laser of 413 nm in wavelength is used for cutting the digital video disc. The length P of a shortest pit which can be formed in the disc can be determined from the relation (1) below:

$$P=K(NA/\lambda) \qquad (1)$$

where $\lambda$ is the wavelength of laser beam, NA is the numerical aperture, and K is the process factor (depends upon the properties of a photoresist used, and usually takes a value of 0.8–0.9).

Therefore, for a digital video disc, putting $\lambda$=413 nm, NA=0.9 and K=0.9 in the relation (1) will provide a shortest pit length of 0.4 $\mu$m.

Along with the great progresses of recent technology of information communications and image processing, the aforementioned optical disc has been required to have a capacity several times larger than ever. For example, a DVD of 12 cm in diameter is required to have a storage capacity of 15 GB on one side thereof. To meet these requirements, the shortest pit length should be further reduced to 0.22 $\mu$m and track pitch be to 0.41 $\mu$m.

As seen from the above-mentioned relation (1), a decreased shortest wavelength of laser beam and an increased numerical aperture (NA) of an objective lens used are required for forming pits with such a high density. However, the currently available objective lens NA of 0.9 is nearly the upper limit because of the lens precision which can be attained in the design and manufacture of the objective lens. For example, when an ultraviolet laser of 250 nm in wavelength is used, a shortest pit length of 0.23 $\mu$m is derived by using a process factor K of 0.8 in the relation (1).

Therefore, by cutting a photoresist having similar sensitivity and resolution to the conventional ones with respect to a far ultraviolet laser, it is possible to produce an optical disc having a storage capacity of 15 GB.

However, the conventional photoresist generally used in manufacture of optical discs, for example, novolak type photoresist, is conditioned to have a molecular design optimized for use in an exposure equipment using g ray of 436 nm in wavelength in the conventional photolithography originally used for manufacture of semiconductor devices. The light absorption will abruptly increase with a wavelength of less than 300 nm.

Thus, when the novolak type photoresist is cut using a far ultraviolet laser, the contrast value ($\gamma$ value) upon which the resolution depends is deteriorated due to a considerable light absorption in the photoresist, so that pits thus formed will have each a poor edge definition or a sloped edge profile. Further, since the photoresist is less sensitive to the far ultraviolet laser for the same reason, the cutting efficiency will considerably decrease. So, it is very difficult to cut the conventional photoresist as it is with a far ultraviolet laser.

SUMMARY OF THE INVENTION

Accordingly, the present invention has an object to overcome the above-mentioned drawbacks of the prior art by providing a method of forming a mother for use in manufacture of an optical disc having a high density and large storage capacity, wherein a photoresist can be cut to have a high-density pit/groove pattern including extremely fine pits and grooves.

The above object can be accomplished by providing a method of forming a mother for use in an optical disc manufacturing process, comprising the steps of applying a photoresist onto a substrate; exposing the photoresist-coated substrate to a laser beam of 300 nm or less in wavelength to form a latent image corresponding to an information signal; and developing the photoresist on the substrate to form a pattern of pits and grooves in the photoresist; the photoresist having a mean value of 0.1 or less between extinction coefficients before and after exposure to the laser beam.

According to the present invention, the photoresist used has a mean value of 0.1 or less between an extinction coefficient before it is exposed to a laser beam of 300 nm or less in wavelength and a one after exposure to the laser beam, so that the photoresist can be cut with a high precision to have formed therein a pattern of pits and grooves each having a well-defined or steep edge profile. Thus, very fine pits and grooves can be formed, and thus a high-quality mother can be formed with a high productivity to permit to produce an optical disc having a storage capacity of 15 G for example.

BRIEF DESCRIPTION OF THE DRAWINGS

These objects and other objects, features and advantages of the present intention will become more apparent from the following detailed description of the present invention when taken in conjunction with the accompanying drawings, of which:

FIG. 3 is a characteristic curve showing the relation between the wavelength and spectral transmittance of a photoresist used in the present invention and having a light absorption coefficient a;

FIG. 4 is a photo showing the surface status of a stamper produced using the photoresist having the light absorption coefficient a;

FIG. 5 is a characteristic curve showing the relation between the wavelength and spectral transmittance of a photoresist having a light absorption coefficient b and taken for comparison with the photoresist having the light absorption coefficient a.

DETAILED DESCRIPTION OF THE PREFERRED EMBODIMENTS

For optically cutting a mother for use in the optical disc manufacturing process, a glass substrate of 220 mm in outside diameter and 6 mm in thickness is prepared which has a precision-polished surface. Then the glass substrate is applied with a photoresist to a layer thickness of 0.1 μm by a spinner to form a uniform photoresist layer or film.

Figure 1:
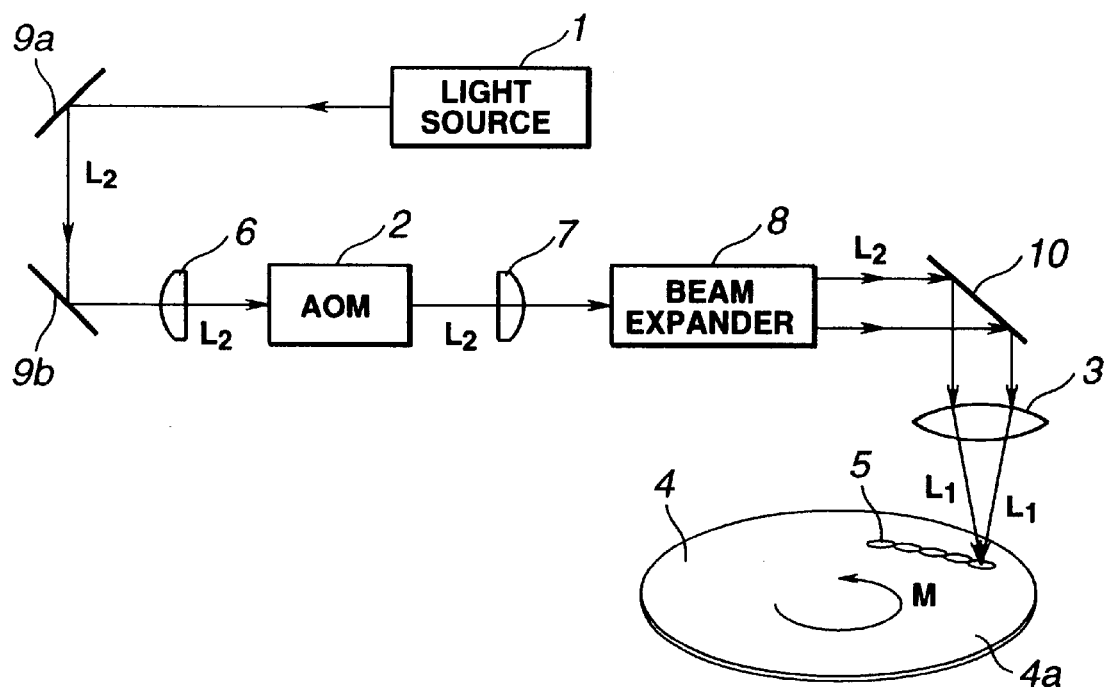
FIG. 1 is a schematic diagram of a process of cutting a photoresist-coated substrate according to the present invention.

As shown in FIG. 1, a light or laser source 1 is used to generate a laser beam of 300 nm or less in wavelength, for example, a frequency-quadrupled YAG laser of 266 nm wavelength. The laser beam generated from the light source 1 is pulse modulated with a digital signal by an acousto-optical element 2 or the like and focused through an objective lens 3 having an NA of 0.9 to a spot of 0.25 μm on the photoresist layer (not shown) on a main side 4a of the glass substrate 4 as shown with an arrow $L_1$ in FIG. 1. Thus a latent image (pit/groove pattern) is formed spirally.

At this time, the glass substrate 4 is spun at a constant linear velocity (CLV) and the objective lens 3 is slid radially in such a manner as to maintain a predetermined track pitch from the inner to outer perimeter of the glass substrate 4. There are provided between the light source 1 and objective lens 3 a lens to focus the laser beam generated from the light source 1 onto the acousto-optical element 2, a lens 7 to render the focused beam to parallel beams, and a beam expander 8 to increase the beam diameter nearly to the incident iris diameter or to more than that. As also seen from FIG. 1, there are provided between the light source 1 and lens 6 mirrors 9a and 9b to deflect the optical path of the laser beam from the light source 1, and between the beam expander 8 and objective lens 3 a mirror 10 to deflect the optical path of the laser beam from the beam expander 8. Thus, the laser beam from the light source 1 is passed through the lens 6 and incident upon the acousto-optical element 2 as indicated with an arrow $L_2$ in FIG. 1, and further focused onto the photoresist layer through the lens 7, beam expander 8 and then the objective lens 3.

Then, the photoresist layer in which the latent image is formed by the above-mentioned cutting, is developed. The latent image will appear as an etched pit/groove pattern.

According to the present invention, the photoresist layer has a mean extinction coefficient $k[=(k_1+k_2)/2]$ of 0.1 or less derived by averaging the sum of an extinction coefficient $k_1$ before exposure to the laser beam of 266 nm in wavelength and a one $k_2$ after the exposure to the laser beam.

Figure 2:
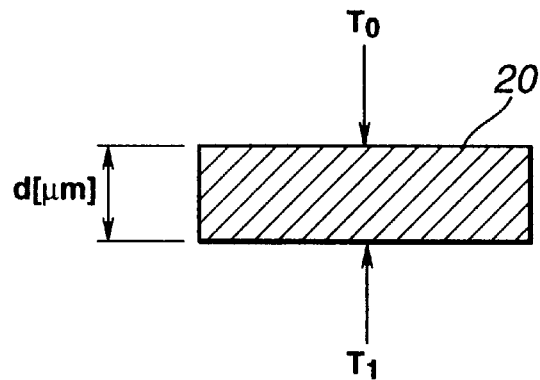
FIG. 2 is a schematic diagram for explanation of the extinction coefficient.

In the above relation, the mean extinction coefficient k is indicative of a light absorption of the photoresist. As shown in FIG. 2, when a light having a wavelength $\lambda$ and intensity $T_0$ is incident upon a layer 20 of d μm in thickness and made of a photoresist having a light absorption coefficient a and a light having an intensity $T_1$ outgoes from the photoresist layer 20, the photoresist layer 20 will have a light transmittance $T_1/T_0 = e^{-ad}$ and an extinction coefficient $k_1 = (\lambda/4\pi)a$.

By cutting a photoresist having a mean extinction coefficient k of 0.1 or less, a latent image of a pit/groove pattern corresponding to a recording modulation signal can be formed accurately with definition of a steep pit edge profile. Namely, by etching in the process of development the pit/groove pattern latent image having been formed in the photoresist layer by the cutting, a mother having a pattern of pits and grooves each having a well-defined or steep bit edge profile can be prepared for producing an optical disc.

Further, a sputtering or electroless plating is used to form a nickel layer of a few ten nm in thickness, for example, on the photoresist layer having the pit/groove pattern formed thereon, and then a nickel layer of about 300 μm in thickness is further formed as a conductive layer on the former nickel layer by electroforming using an electroplating apparatus. The layers thus formed on the glass substrate are separated from the latter to provide a stamper. The stamper will be further adjusted in inside and outside diameters thereof, polished at the rear side and worked at the ends thereof to have a required shape for installation to an optical disc molder.

The procedure of preparing a mother for use to produce an optical disc has briefly been described in the foregoing. Using a far ultraviolet laser-sensitive photoresist having a mean extinction coefficient k of 0.1 or less $(k=(k_1+k_2)/2$ where $k_1$: extinction coefficient thereof before exposure to the laser of 300 nm or less in wavelength and $k_2$: extinction coefficient after exposure to the laser), it is possible to form a convexity/concavity pattern including pits each having a size of 0.2 μm and steep edge profile and thus form with a high productivity a quality mother permitting to produce a high density, high storage capacity optical disc. This was proved through experiments.

Figure 3:
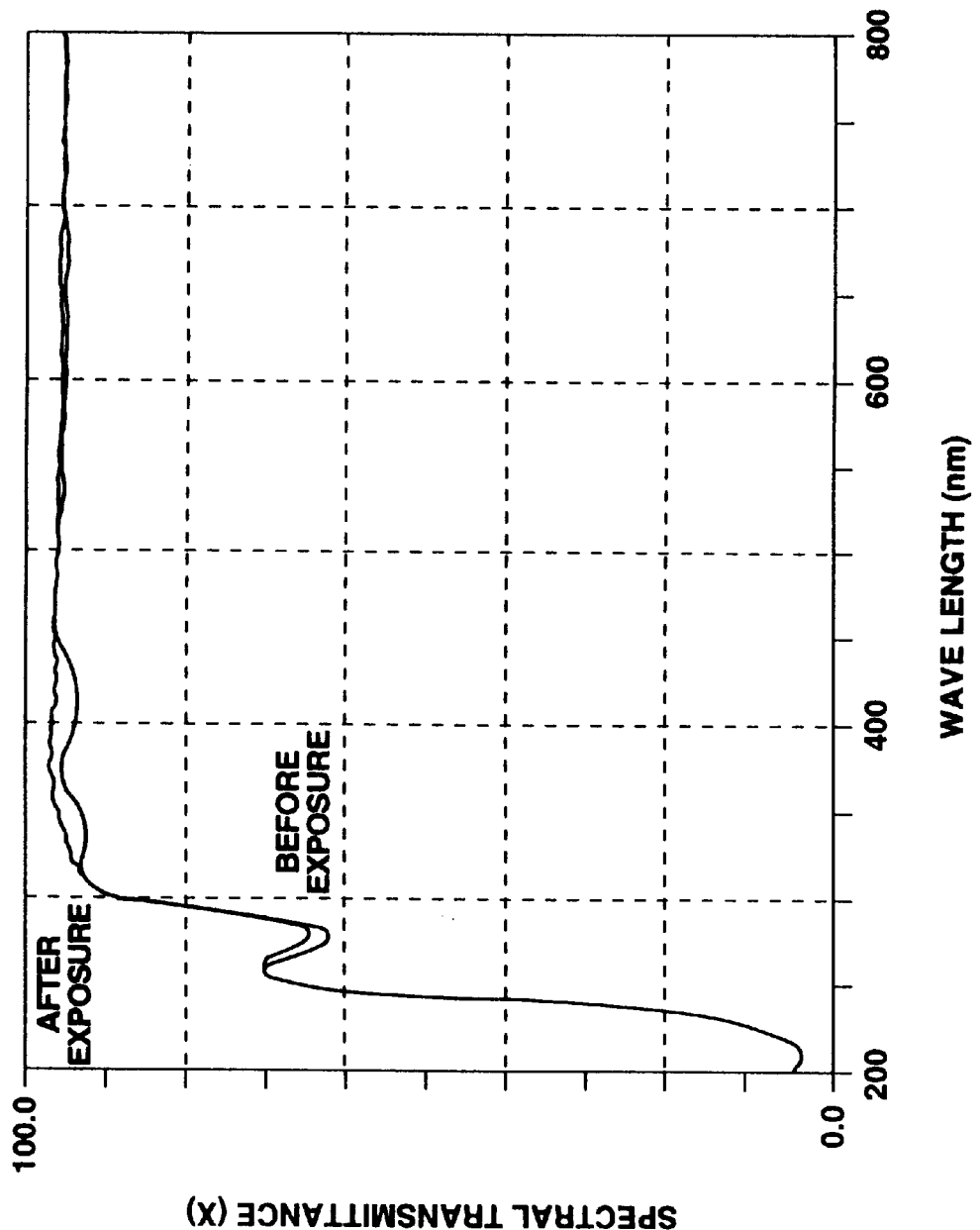

The experiments were conducted as will be described below. A phenol novolak type resin having a basic structure represented by a chemical structural formula 1 shown below was used as a base resin for a photoresist. A diazonaphthoquinone having a basic structure represented by a chemical structural formula 2 shown below was used as a sensitizer. The phenol novolak type resin and diazonaphthoquinone were mixed together to be a novolak type photoresist. The molecular design of the photoresist was optimized to provide a photoresist a having a mean value k=0.08 between the extinction coefficients before and after exposure to a laser beam. The photoresist a has a spectral transmittance as shown in FIG. 3.

Chemical Formula 1:

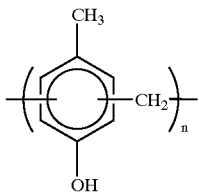

Chemical Formula 2:

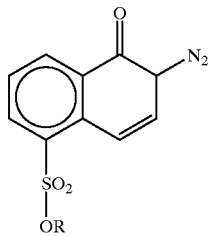

As shown in FIG. 1, the photoresist layer made of the photoresist a was cut by exposing to a far ultraviolet laser of 266 nm in wavelength to form a mother. The mother was used to produce a nickel stamper whose surface status is shown in FIG. 4.

Figure 4:
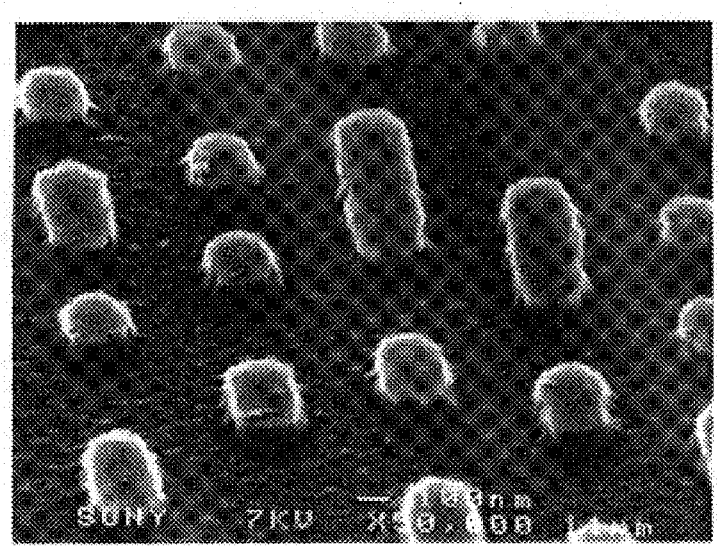

As shown in FIG. 4, when the photoresist a having a mean extinction coefficient k of 0.08 was used, it was possible to form pits each having a steep edge profile with a cutting power density as low as 25 mJ/cm$^2$ or so.

Figure 5:
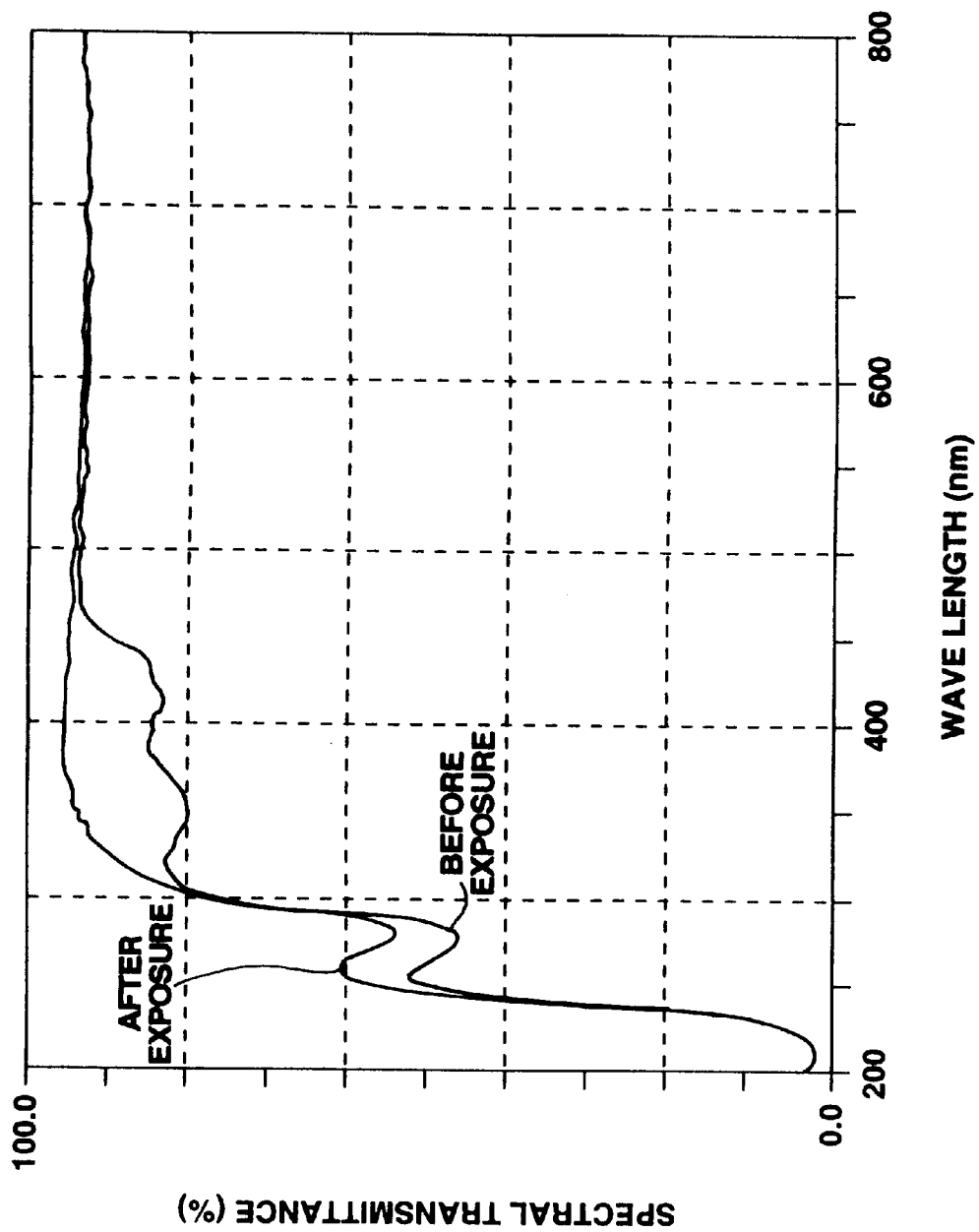

On the other hand, a photoresist b having a mean value k=0.14 between extinction coefficients before and after exposure to a laser was prepared from a conventional novolak type photoresist. A photoresist layer made of the photoresist b was similarly laser cut (with a laser of 266 nm in wavelength) to form a mother. The photoresist b had a spectral transmittance as shown in FIG. 5. The mother was used to produce a nickel stamper whose surface status is shown in FIG. 6.

Figure 6:
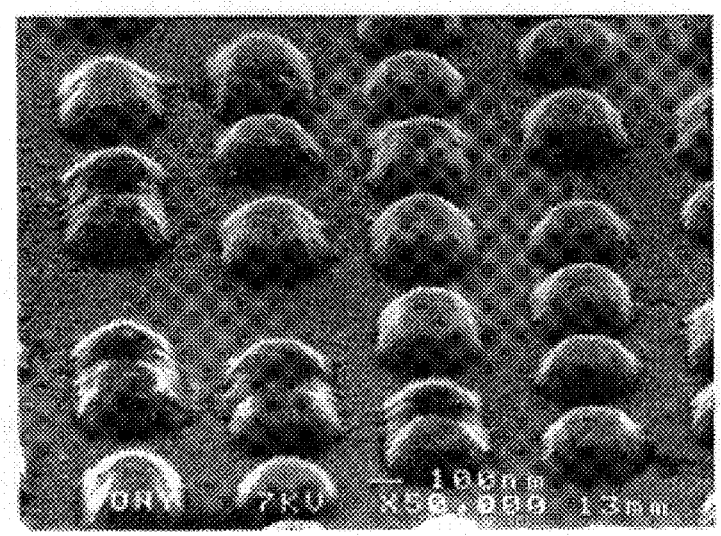
FIG. 6 is a photo showing the surface status of a stamper produced using the photoresist having the light absorption coefficient b.

As shown in FIG. 6, the pits formed by the stamper produced using the mother made from the photoresist b having the mean extinction coefficient k of 0.14 had each a sloped edge profile whose sloped portion is larger than the steep portion. The relatively long pits were found irregular in shape. This is because the photoresist had a large light absorption coefficient and thus the photoresist layer could not be uniformly cut or exposed to the bottom. Further, when a relatively long pit is formed, namely, when the laser beam is turned on for a longer time, so great a heat is generated due to a large light absorption in the photoresist that the photoresist is instantly heated up to a temperature at which its photosensitivity will be deteriorated. By calculating the temperature elevation of the photoresist during the laser cutting through a thermal analysis simulation, it was proved that the photoresist is heated up to about 120° C.

Since a photoresist having a mean extinction coefficient k as shown in FIG. 5 has a low sensitivity to laser beam, a cutting power density of 50 mJ/cm$^2$ or so is required.

As evident from the above, the extinction coefficient k representing the light absorption of photoresist has a great influence on the pit shape after laser cutting, and the mean value k between extinction coefficients before and after exposure to a laser beam should be 0.1 or less. Using a photoresist having a mean extinction coefficient k of 0.1 or less, it is possible to form a high-density convexity/concavity pattern including pits and grooves each having a well-defined or steep edge profile, which will be suitable for a higher storage capacity of an optical disc and contribute to the improvement of optical disc productivity.

As in the above, a photoresist having a mean extinction coefficient k of 0.1 or less, prepared by optimizing the molecular design of the conventional novolak type photoresist, can be used with the materials such as conventional glass substrates and the equipment, which will be industrially advantageous.

As seen from the foregoing, the method according to the present invention uses a photoresist having a mean value of 0.1 or less between the extinction coefficients before and after exposure to a laser of 300 nm or less in wavelength so that the photoresist can be cut accurately with a high density to have formed therein a pattern of extremely fine pits and grooves corresponding to a recording modulation signal. Therefore, the present invention can form with a high productivity a quality mother permitting to produce a high density, high storage capacity optical disc.

What is claimed is:

1. A method of making a mother for use in making a stamper for use in an optical disk manufacturing process, the method comprising the steps of:

providing a substrate;

applying a photoresist onto the substrate;

exposing the photoresist-coated substrate to a laser beam of 300 nm or less in wavelength forming a latent image having pits and grooves corresponding to an information signal; and developing the photoresist on the substrate to form a convexity/concavity pattern including the pits and grooves in the photoresist wherein the pits have a length of 0.23 micron meters or less.

2. The method as set forth in claim 1, wherein the photoresist contains a diazonaphthoquinone sensitizer and a novolak resin.

3. The method of claim 1, wherein the laser is focused through an objective lens having a numerical aperture of 0.9 to a spot of 0.25 micro meters on the photoresist.

4. The method of claim 1, wherein the photoresist has an average extinction coefficient of 0.08 between extinction coefficients before and after exposure to the laser beam.

5. The method of claim 1, wherein the pits have a cutting power density of about 25 mJ/cm$^2$.

* * * * *